A. EINICHER.
MACHINE FOR DRILLING OR THE LIKE IRREGULAR SURFACES.
APPLICATION FILED AUG. 28, 1912.
1,057,132. Patented Mar. 25, 1913.
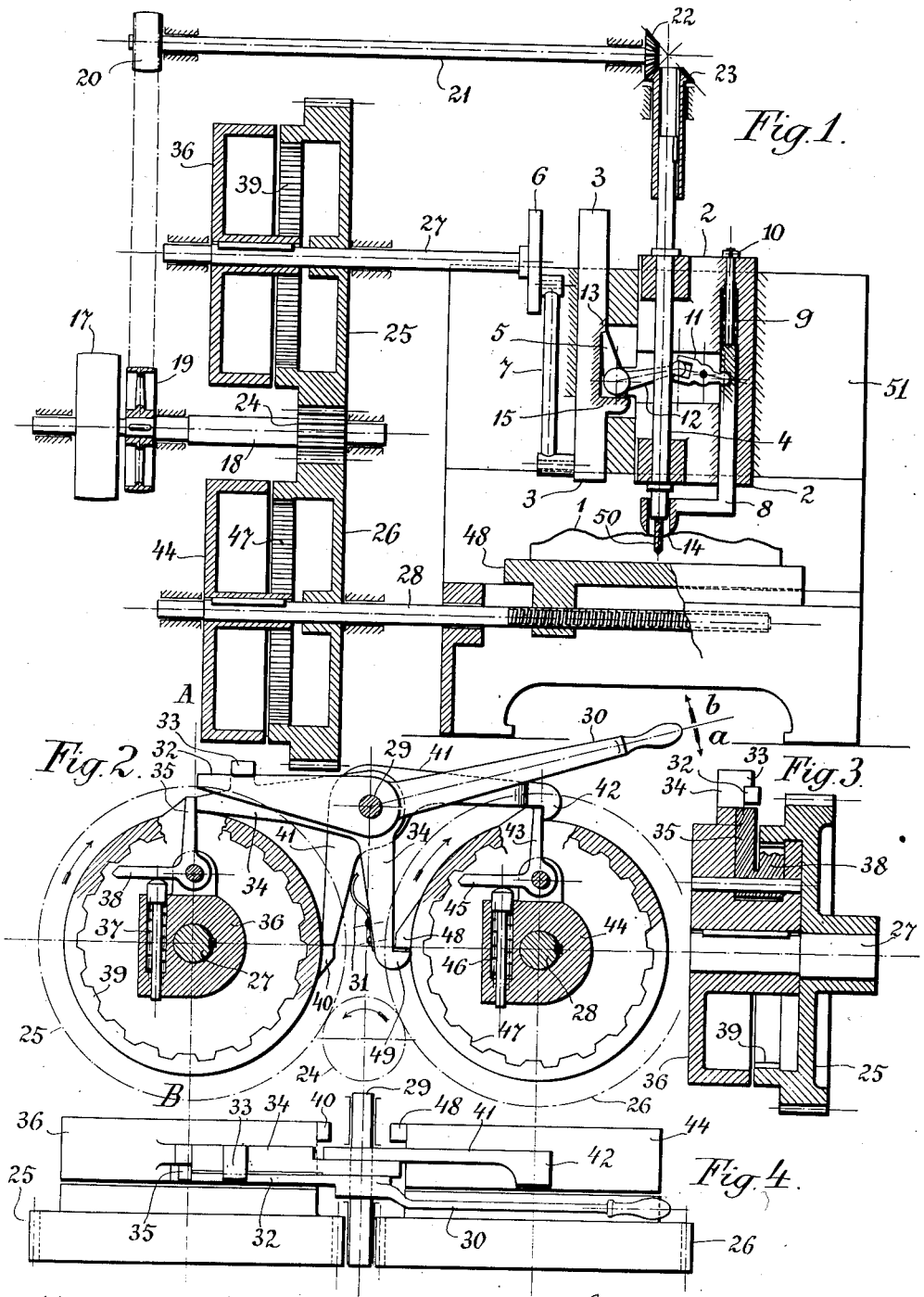

UNITED STATES PATENT OFFICE.

ANTON EINICHER, OF BUDAPEST, AUSTRIA-HUNGARY, ASSIGNOR TO THE FIRM OF WAFFEN UND MASCHINENFABRIKS ACTIENGESELLSCHAFT, OF BUDAPEST, AUSTRIA-HUNGARY.

MACHINE FOR DRILLING OR THE LIKE IRREGULAR SURFACES.

1,057,132.   Specification of Letters Patent.   Patented Mar. 25, 1913.

Application filed August 28, 1912. Serial No. 717,558.

*To all whom it may concern:*

Be it known that I, ANTON EINICHER, a subject of the King of Hungary, and residing at Budapest, Austria-Hungary, have invented certain new and useful Improvements in Machines for Drilling, Incising, or Pressing a Plurality of Holes into Irregularly-Shaped Bodies, of which the following is a specification.

This invention relates to a machine by which irregularly shaped bodies, such as trunks of trees and the like, are provided with a large number of cavities, incisions or impressions distributed either over the whole surface of the trunk or the like or merely over a certain portion thereof.

One of the objects of thus working the wood is to facilitate the entering of dyeing or impregnating substances and the like, but the subject matter of the application may be used for other purposes.

The gist of the invention resides in forcing a number of tools, such as incision tools or the like automatically against and into the piece of wood to be treated, which is screwed fast, as usual; then withdrawing the tools, feeding the wood forward, letting the tools repeat their action, withdrawing them again, feeding the piece in work further forward, and so on until the whole length to be treated is finished.

The incisions, holes or the like, produced in the manner just in general stated are all of the same depth, also if the piece of work has an irregular section or if its surface is irregularly shaped, that is to say, the distance between the surface of the wood and the bottom of the holes is always the same, irrespective of how the piece of wood may be shaped.

In order to make my invention more clear, I refer to the accompanying drawing, in which similar letters denote similar parts throughout the several views, and in which:

Figure 1 is a sectional front view of my improved machine, Fig. 2 is a vertical section through the starting device, Fig. 3 is a section through this device in line A—B of Fig. 2, and Fig. 4 is a plan of this device.

The piece of wood to be treated is supported upon a table 48 and fastened to the same. The tools 50, which are for instance, quickly rotating nails or drills, are arranged singly or in groups or sets (the drawing, for the sake of simplicity, shows one such tool only) and they are moved against and away from the piece of work in a manner which is fully described hereinafter.

The tools are driven from pulleys 17, 19 and 20 through shaftings 21 and 4 by means of bevel wheels 22 and 23. The tools are attached to tool holders or slides 2 moving in guides 51. Each guide 51 contains, besides the respective holder or slide, another slide 3, moved up and down by an axle 27, a crank disk 6, and a connecting rod 7, the extent of this movement being somewhat greater than the depth of the holes to be produced. This movement of the slide 3 is transmitted to the tool holder 2, as is also more fully described hereinafter.

The operation of the machine is such that first the tool holder 2 with its tools is depressed, whereby holes are formed in the piece of work 1. The tool holder then rises again and the piece 1 is fed forward for a certain distance so that another part of its surface is in position to be worked. Now, another series of holes is produced, and so the work is continued as long as necessary. All movements requisite for this succession of actions are brought about by means of a hand lever and are automatically continued and transmitted by the machine itself.

The machine is driven from a shaft 18 having a cogwheel 24 meshing with cogwheels 25, 26, which are constantly rotated from said shaft. The cogwheels 25, 26 have, besides their external gears also internal gears 39, 47 and they sit loosely upon their axles 27, 28. After the machine has been started, first a disk 36 keyed to the axle 27 is coupled with the cogwheel 25 and the rotary motion of the latter is thus transmitted to the shaft 27, which now makes one revolution, thereby causing the tools to make one stroke. The disk 36 is then uncoupled from the cogwheel 25 and a disk 44 keyed to the shaft 28 is coupled with the cogwheel 26, whereby the shaft 28 is rotated and shifts the working table for a certain length. This is effected by the threaded engagement of the shaft and the foot of the table.

The disks 36 and 44 coöperate with a hand lever 30 fulcrumed at 29 and being under the pressure of a spring 31, which constantly tends to force the lever back into its former position after it has been moved in the direction to the disk 44. The arrow A, Fig. 2, indicates this direction. The lever 30 is rigidly connected with a pawl 32, which, when moved off the disk 36 pushes upon a lug 33 of a lever 34, which thereby is moved off the leg 35 of a bellcrank lever having its bearing in the boss of the disk 36. The other leg 38 of said bellcrank lever is under the pressure of a spring 37 acting upon said leg by the mediation of a bolt situated in said boss, and owing to this action the leg 38 is pressed into the interior gearing of the cogwheel 25 so that thereby the rotation of the disk 36 is transmitted to this cogwheel. Before, however, the disk 36 has made one complete revolution, a lug 40 forming part of the disk 36 pushes upon a lever 41 located upon the axle 29, and a projection 42 of this lever having held up to then a leg 43 of a bellcrank lever 43—45 leaves said leg. The bellcrank lever 43—45 has its bearing at the boss of the disk 44; its leg 45 is also under the pressure of a spring 46, similar to the leg 38 of the bellcrank lever 35—38, and owing to said spring 46 the leg 45 is pressed into the interior gearing 47 of the cogwheel 26 whereby the rotation of the disk 44 is transmitted to this cogwheel, as well as to the shaft 28. Shortly after the action of the lug 40, the leg 35 pushes upon the pawl 34 whereby the leg 38 is moved off the gearing 39 thus causing the disk 36 and the shaft 27 to cease rotating.

Before the disk 44 has made one complete rotation, a lug 48 forming part of it pushes upon the endpiece 49 of the bellcrank lever 34, whereby the leg 35 of the bellcrank lever 35—38 is released. Thus, the cogwheel 25 is again coupled to the disk 36 and the train of movements before described is repeated. Instantly thereafter, the lug 42 of the lever 41 pushes upon the leg 43 and releases the leg 45 from the gearing 47, causing thus the disk 44 and the shaft 28 to cease rotating. Therefore, as long as the hand lever 30 remains in the position shown, i. e. the position of rest, and as long as the pawl 32 of said lever is not in contact with the leg 35, the axle 27 will make one complete rotation, then stop, then the axle 28 will make one complete rotation, then stop; after this the axle 27 will make another rotation and so on the times of rotation and of rest following each other continuously and automatically as long as desired. Setting the machine at rest is effected by turning the lever 30 in the direction of the arrow B until the pawl 32 catches the leg 35 whereby the leg 38 of the same lever is moved off the interior gearing 39 of the cogwheel 25, so that no further coöperation can take place.

In order to obtain a uniform depth of the holes in spite of the work piece having, perhaps, an irregular surface, the following contrivance has been advised: The slide 2 contains a rod 8, the lower end of which is bent and takes around the drill spindle or drill; the end proper of said rod comes in contact with the surface of the piece of work shortly before the full depth has been drilled. The upper part of the rod is reduced and this end extends to above the upper surface of the slide 2 where it is provided with an adjusting ring 10 serving to adjust the rod 8 in height, as well as to adjust a helix 9 surrounding said reduced part of the rod. The slide 2 has a recess containing a double armed lever 11, one arm of which takes into a cavity of the rod 8, and the other arm of which is coupled with a bellcrank lever 12—5 the arm 5 of which forms a pawl coöperating with a lug 13 of the slide 3. The pawl 5 is pressed under said lug 13 by the spring 9. The slide 3 when moving downward causes the pawl 5, or the bellcrank lever 5—12 respectively, and the slide 2 with the spindle 4 and the rod 8, to move in the same direction, the movement of the slide being transmitted to all these parts by the lug 13 of the slide 3, as shown in Fig. 1. The lower end 14 of the rod 8 touches then the upper surfaces of the piece of work 1, and as the other parts move farther downward, the spring 9 is compressed and finally the levers 11 and 12 are turned, causing thus the pawl 5 to leave the lug 13 of the slide 3 so as to uncouple the slide 2 from it. The slide 3 continues in its downward movement corresponding to the stroke of the connecting rod 7, and on its backward, i. e. upward movement a projection 15 of the slide 3 pushes upon the pawl 5 and lifts it together with the slide 2 and the rod 8, and as the spring 9 now is free to expand, it raises the rod 8 and at the same time turns the levers 11 and 12, thus returning all parts to their former position. At any rate the means effecting the feed of the drill are thrown out of gear by the other means before described and it is obvious that the depth of the holes will always be the same, no matter how irregular the surface or configuration of the piece of wood or the like may be.

What I claim as new and desire to secure by Letters Patent is:

1. In a machine for drilling, incising or pressing holes of equal depth into irregularly-shaped work-pieces by reciprocated tool holders coöperating with an intermittently fed working table, the combination of an axle operating means to effect the working movement of the tools, another axle operating means to effect the feed motion of the work table, two wheels sitting loosely upon said two axles and constantly rotated from a shafting, two disks keyed to said two axles, and means for temporarily connecting them with said loose wheels, means provided upon the disk of the tool operating axle and adapted to couple the axle moving the work table to its wheel after the other disk has made one complete rotation, means for intermittently coupling and uncoupling the clutches, and means provided upon the disk of the axle moving the work table and adapted to couple the tool operating axle to its disk after the other disk has made one complete rotation.

2. In a machine for drilling, incising or pressing holes of equal depth into irregularly shaped work-pieces by reciprocated tool holders coöperating with an intermittently fed work table, the combination of an axle operating means to effect the working movement of the tools, a second axle operating means to effect the feed motion of the work table, two wheels sitting loosely upon said two axles constantly rotated from a shafting, two disks keyed to the said two axles, and means for temporarily connecting them with said loose wheels, means provided upon the disk of the tool operating axle and adapted to couple the axle moving the work table to its wheel after the other disk has made one complete rotation, a hand lever adapted to couple the said tool operating axle to its disks when turned from its middle position in one direction, and to uncouple said axle and disk when turned from said position in the other direction.

In testimony whereof I affix my signature in presence of two witnesses.

ANTON EINICHER.

Witnesses:
 FÜLÖYS SCHÖN,
 JOHN J. RONTO.